(12) United States Patent
Becherucci et al.

(10) Patent No.: US 6,878,203 B2
(45) Date of Patent: Apr. 12, 2005

(54) RESIN APPLICATION SYSTEM FOR DYNAMO-ELECTRIC MACHINE COMPONENTS

(75) Inventors: Raffaele Becherucci, Florence (IT); Gianfranco Stratico, Siena (IT)

(73) Assignee: Axis USA, Inc., Tampa, FL (US)

( * ) Notice: Subject to any disclaimer, the term of this patent is extended or adjusted under 35 U.S.C. 154(b) by 12 days.

(21) Appl. No.: 10/073,400

(22) Filed: Feb. 11, 2002

(65) Prior Publication Data

US 2002/0108566 A1 Aug. 15, 2002

Related U.S. Application Data

(60) Provisional application No. 60/268,103, filed on Feb. 12, 2001.

(51) Int. Cl.[7] .................................................. B05C 5/00
(52) U.S. Cl. ...................... 118/300; 118/313; 118/319; 118/320; 118/500; 427/374.1; 427/425; 269/57; 269/37
(58) Field of Search ................................ 118/300, 314, 118/315, 319, 58, 64, 66, 69, 500; 198/345.1–345, 575; 269/37, 50, 52; 427/314, 374.1, 425

(56) References Cited

U.S. PATENT DOCUMENTS

| | | | |
|---|---|---|---|
| 1,655,290 A | * | 1/1928 | Phelps et al. ............... 118/313 |
| 1,900,104 A | * | 3/1933 | Hageman et al. ............ 118/58 |
| 3,145,127 A | | 8/1964 | Baun |
| 3,261,707 A | | 7/1966 | Korski et al. |
| 3,355,309 A | | 11/1967 | Bender et al. |
| 3,355,310 A | | 11/1967 | De Jean et al. |
| 3,386,382 A | | 6/1968 | Schuette et al. |
| 3,390,661 A | * | 7/1968 | Wrench ........................ 118/58 |
| 3,431,887 A | | 3/1969 | Pettigrew et al. |
| 3,440,078 A | | 4/1969 | Sharetts |
| 3,527,502 A | | 9/1970 | Graham |
| 3,619,240 A | * | 11/1971 | Toussaint et al. ........... 427/230 |
| 3,646,374 A | | 2/1972 | Jordan et al. |
| 3,660,136 A | | 5/1972 | Guilbault |
| 3,670,699 A | | 6/1972 | Sargent |
| 3,802,380 A | | 4/1974 | Ford et al. |
| 3,809,011 A | | 5/1974 | Fabre |
| 3,865,610 A | | 2/1975 | Goodridge et al. |
| 3,889,015 A | | 6/1975 | English |
| 3,901,180 A | * | 8/1975 | Allen et al. ................. 118/679 |
| 3,901,185 A | | 8/1975 | Goodridge et al. |
| 3,921,574 A | | 11/1975 | English |

(Continued)

FOREIGN PATENT DOCUMENTS

| | | |
|---|---|---|
| CA | 0 974 049 | 9/1975 |
| CH | 381 608 | 10/1964 |
| CH | 499224 | 11/1970 |
| CH | 678715 | 10/1991 |
| DE | 46 793 | 6/1962 |
| DE | 1 756 268 | 4/1970 |
| DE | 37 32 113 | 10/1988 |
| DE | 37 20 525 | 12/1988 |

(Continued)

*Primary Examiner*—Chris Fiorilla
*Assistant Examiner*—Michelle Acevedo Lazor
(74) *Attorney, Agent, or Firm*—Fish & Neave IP Group of Ropes & Gray LLP

(57) ABSTRACT

A resin application station has processing units for heating dynamo-electric machine components. In one or more of the processing units batches of components are placed in fixtures on vertically rotating support plates. The vertically rotating support plates are mounted in cabinets. Heated air is circulated in the cabinets to control the ambient temperature. The components travel through regions of the controlled temperature ambient as the support plates rotate and are heated to process temperatures. Intermittent rotation of a support plate in a unit allows loading and unloading of an individual component from the unit while the support plate is stationary. The support plate rotations in all the units are synchronized to increase the station throughput.

24 Claims, 9 Drawing Sheets

U.S. PATENT DOCUMENTS

| | | | |
|---|---|---|---|
| 4,022,155 A | | 5/1977 | Campagna et al. |
| 4,230,068 A | | 10/1980 | Itoh et al. |
| 4,319,543 A | | 3/1982 | Shank |
| 4,321,281 A | | 3/1982 | Itoh |
| 4,353,941 A | | 10/1982 | Bowman |
| 4,407,854 A | | 10/1983 | Pan |
| 4,517,219 A | | 5/1985 | Hajek |
| 4,565,718 A | | 1/1986 | Katsuyama et al. |
| 4,730,575 A | * | 3/1988 | Jenkins ................. 118/47 |
| 4,963,391 A | | 10/1990 | Bair et al. |
| 4,984,353 A | | 1/1991 | Santandrea et al. |
| 4,249,068 A | | 2/1991 | Mangan et al. |
| 5,090,350 A | * | 2/1992 | Hammond et al. ........... 118/50 |
| 5,179,910 A | | 1/1993 | Habsburg-Lothringen |
| 5,254,164 A | * | 10/1993 | Masahumi ................. 118/58 |
| 5,258,594 A | | 11/1993 | Pioch et al. |
| 5,401,531 A | | 3/1995 | Faraoni et al. |
| 5,433,572 A | * | 7/1995 | Swain et al. ................. 414/27 |
| 5,443,643 A | | 8/1995 | Cardini et al. |
| 5,470,615 A | | 11/1995 | Sbalchiero et al. |
| 5,540,776 A | | 7/1996 | Habsburg-Lothringen |
| 5,569,439 A | | 10/1996 | Cardini et al. |
| 5,919,308 A | | 7/1999 | Galassi et al. |
| 6,015,114 A | | 1/2000 | Randazzo et al. |
| 6,024,795 A | | 2/2000 | Galassi et al. |
| 6,226,857 B1 | | 5/2001 | Becherucci |
| 6,302,961 B1 | * | 10/2001 | Robie et al. ................... 118/66 |
| 6,325,199 B1 | | 12/2001 | Becherucci et al. |

FOREIGN PATENT DOCUMENTS

| | | |
|---|---|---|
| DE | 91 06 384.1 | 8/1991 |
| EP | 0 007 207 | 1/1980 |
| EP | 0 321 223 | 6/1989 |
| EP | 0 489 962 A1 | 6/1992 |
| EP | 0 0501264 B1 | 9/1992 |
| EP | 0 509 366 A2 | 10/1992 |
| EP | 0 622 128 A1 | 11/1994 |
| EP | 0 757 425 | 2/1997 |
| FR | 1 494 745 | 9/1967 |
| FR | 2 473 361 | 7/1981 |
| FR | 2 645 367 | 10/1990 |
| FR | 2 649 912 | 1/1991 |
| GB | 910 297 | 11/1962 |
| GB | 1 001 030 | 8/1965 |
| GB | 1 025 492 | 4/1966 |
| JP | 57-13951 | 1/1982 |
| JP | 61076049 A2 | 9/1984 |
| JP | 62-54137 | 3/1993 |
| WO | WO 79/00756 | 10/1979 |

* cited by examiner

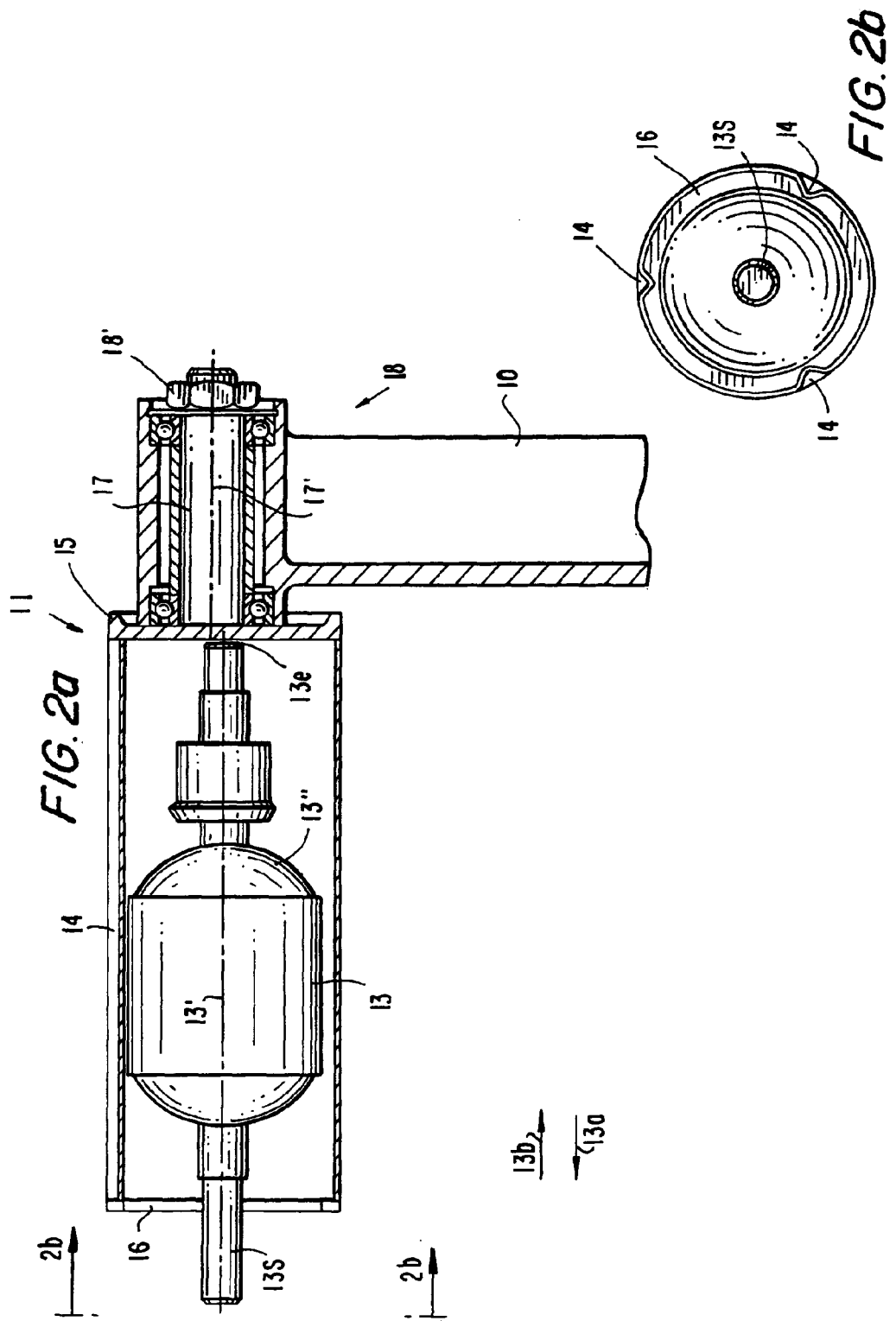

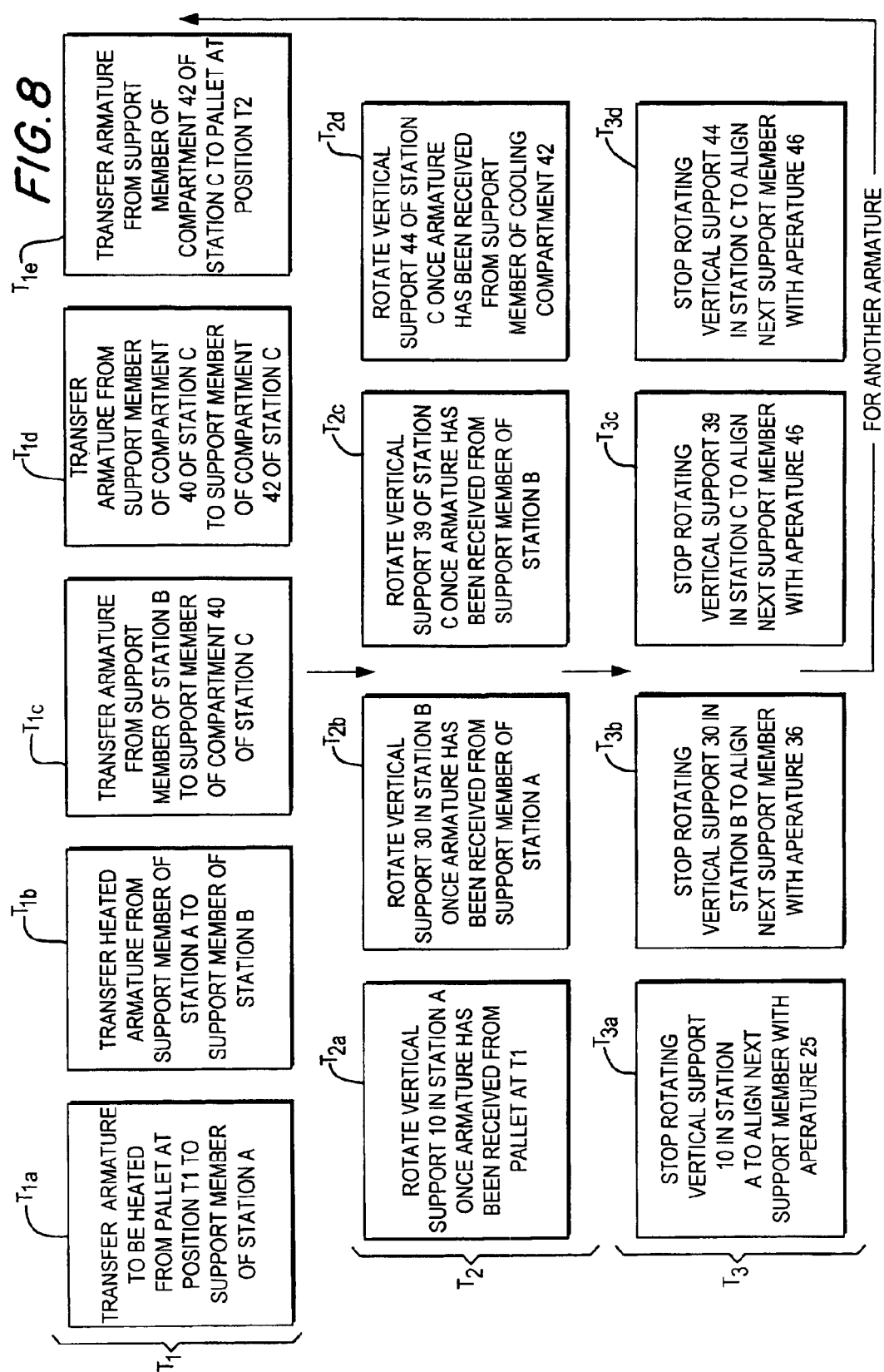

RESIN APPLICATION SYSTEM FOR DYNAMO-ELECTRIC MACHINE COMPONENTS

This application claims the benefit of U.S. provisional application No. 60/268,103 filed Feb. 12, 2001.

BACKGROUND OF THE INVENTION

The present invention relates to improved solutions for conveying and processing dynamo-electric machine components (e.g., armatures or stators for electric motors, generators, or alternators) through resin application process steps.

Resin application steps are common in the manufacturing of dynamo-electric machine components. The dynamo-electric machine components such as armatures include insulated wire coils wound on ferromagnetic cores. Electric current passes through the wire coils in the operation of the dynamo-electric machine in which the component is used. For optimal performance of the dynamo, the dynamo-electric machine components' wire coils may be subject to tight dimensional tolerances. However, the wires in the coils, which are mechanically wound, are susceptible to loosening by vibration or heat during further manufacturing or assembly steps. Operation of the dynamo-electric machine itself may also cause vibrations and heat, which tend to loosen the wire coils. Electrical current, which passes through the wire coils, also may generate electro-mechanical forces that tend to loosen or deform the wire coil shape. To avoid distortion of the wire coil dimensions due to these or other causes, the wires in a coil are customarily coated and encased in an adhesive bonding material matrix such as a resin. The resin mechanically stabilizes the wire coil by binding the wires in the coil together, and thereby preventing relative movement of the wires. Additionally, the resin coating provides a heat conduction path to dissipate heat generated in the wires. The resin coating also protects the wire insulation from abrasion during further steps of the manufacturing process and during the operation of the dynamo-electric machine.

The resin coating and bonding process steps are carried out in the dynamo-electric manufacturing process using resin application stations. Resin application stations may, for example, include resin impregnation machines in which liquid dispensers trickle liquid resins on to the wire coils. The dispensed liquid resin impregnates the wire coils by filling up interwire spaces, for example, by capillary action. Alternatively, resin impregnation machines may dip the components in liquid baths to coat the wires with the resin. A resin application station usually involves additional machines for preparing the dynamo-electric machine components for resin impregnation, and for curing or hardening the impregnated liquid resin. These additional machines may include pre-heating units or curing units for regulating the temperature of the components during the resin application process. Resin application stations are integrated into manufacturing assembly lines by the use of suitable component holding devices and conveyor apparatus. The conveyor apparatus may carry components in pallets on belts running between the resin application stations and other processing stations in the assembly line.

Resin impregnation machines and ovens that are used in resin application stations, particular dispositions of resin application stations along an assembly line, transport routes by which the component-carrying pallets reach the stations, and sequences by which the pallets reach the stations have been described, for example, in Santandrea et al. U.S. Pat. No. 4,984,353, Cardini et al. U.S. Pat. No. 5,443,643, Cardini et al. U.S. Pat. No. 5,569,439, Faraoni et al. U.S. Pat. No. 5,401,531, Galassi et al. U.S. Pat. No. 5,919,308, Galassi et al. U.S. Pat. No. 6,024,795, and Becherucci et al. U.S. patent application Ser. No. 09/409,038, Becherucci et al. U.S. Pat. No. 6,226,857, and Sabatino et al. European Patent 0,757,425, all of which are hereby incorporated by reference herein in their entireties.

The uniformity and reproducibility dynamo-electric machine manufacturing processes are sensitive to variations in processing conditions. For example, in resin application processes, for example, resin viscosity and consequently resin settling may be affected by variations or fluctuations in temperature.

Consideration is now being given generally to ways of providing solutions for improving uniformity and reproducibility in dynamo-electric machine component manufacture. Attention is directed to resin application stations including resin impregnation machines, heating units, and curing units, with a view to improve the resin coating process and to improve the overall efficiency of dynamo-electric machine component manufacturing.

SUMMARY OF THE INVENTION

In accordance with the principles of the invention, resin application stations for impregnating dynamo-electric machine component wire coils with liquid resin in order to coat and bond the wires in a resinous matrix are provided.

The resin application stations include at least a preheating unit, a resin impregnation unit, and a resin-curing unit. The units may be used to carry out similarly named process steps in the manufacture of dynamo-electric machine components. Each unit has a cabinet or enclosure inside which the process step is carried out. Support members or fixtures are provided in each of these units to hold individual component subassemblies in proper orientation for processing.

Each of these three units includes a vertical rotating support structure. This support is mounted inside the unit cabinet so that the support structure can rotate about a horizontal axis. Large numbers of support fixtures may be disposed on a support structure. Thus, these units may have large load capacities for simultaneously processing several subassemblies.

The ambient temperature in the unit cabinets is controlled to ensure uniformity and consistent processing conditions. In particular, forced air heating techniques are used to provide a heated ambient for uniformly maintaining large numbers of subassemblies at the same predetermined temperature. The predetermined temperatures may be those that are suitable for the resin application processes. The air flow or circulation paths in the unit cabinets are designed to increase uniformity in the heating of subassemblies.

The resin application station itself is configured to integrate the operation of the three units used in the resin application processes. The resin application station is also configured so that it may be integrated in an assembly line, and for use with conventional assembly line transfer tools and control units.

By scheduling the processing and transfer of subassemblies through the station units using suitable control unit programming, the workflow through the station may be maximized.

BRIEF DESCRIPTION OF THE DRAWINGS

Further features of the invention, its nature, and various advantages will be more apparent from the following detailed description of the preferred embodiments and the accompanying drawings, wherein like reference characters represent like elements throughout, and in which:

FIG. 2a is an enlarged view of a portion of the preheating unit of FIG. 2, showing a support member carrying an armature.

FIG. 2b is a sectional view of the support member of FIG. 2a, as seen from directions 2b—2b in FIG. 2a.

FIG. 7 additionally shows a station control unit, and gripper units for holding and moving the machine components through the resin application station. However, for clarity, several parts of the preheating unit, the resin impregnation unit, and the curing unit that were shown in FIG. 1 are omitted from FIG. 7.

FIG. 8 is a schematic representation listing control steps performed by the control unit of FIG. 7 for synchronizing the operation of the preheating unit, the resin impregnation unit, and the curing unit.

Figure 1:
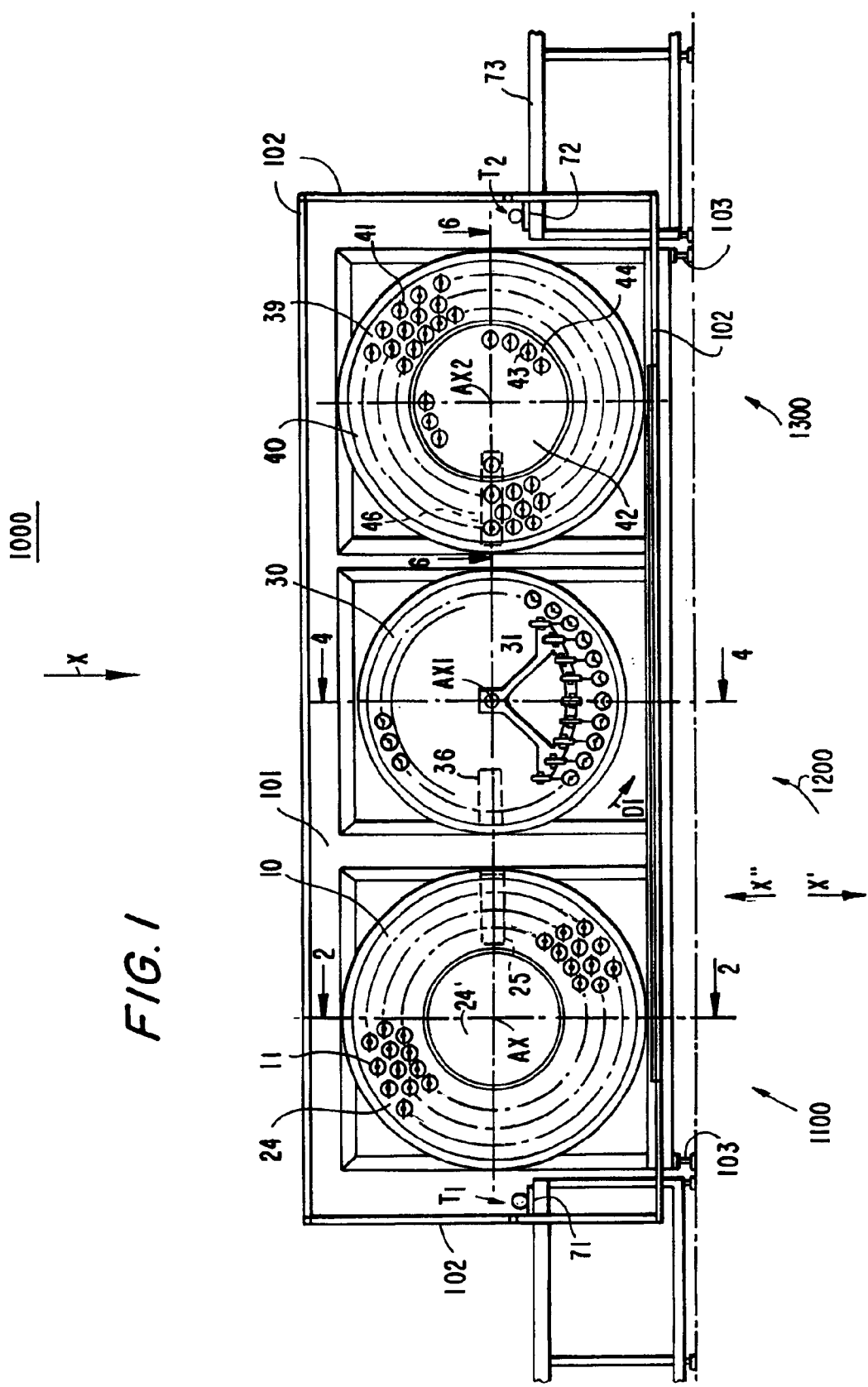
FIG. 1 is a side elevational view of a resin application station with a cover removed to show a preheating unit, a resin impregnation unit, and a curing unit in accordance with the principles of this invention.

In several of the accompanying drawings, which show sectional views, hatching or shading of various sectional elements have been omitted for clarity. It will be understood that this omission of hatching or shading in the drawings is for the purpose of clarity in illustration only.

DETAILED DESCRIPTION OF THE PREFERRED EMBODIMENT

The present disclosure provides solutions for improving uniformity and reproducibility in dynamo-electric machine component manufacture. A disclosed solution concerns resin application stations for applying dynamo-electric machine components with resin. Integrated resin application stations in which the dynamo-electric machine component subassemblies can be prepared for resin application, and in which resin can be applied and cured are disclosed.

Other aspects of the present invention relate to improved solutions for conveying the component subassemblies through the resin application stations and for integration of the workflow through the workstation and the assembly line in which the workstation is deployed.

In accordance with the present invention, a resin application workstation is configured to include a preheating unit, a resin application unit, and a resin curing unit. The preheating, resin application, and curing units are placed adjacent to each other in sequence matching the steps in the manufacturing process. Each unit has a designed capacity sufficient to batch process a suitable number of the subassemblies substantially simultaneously. The workstation is configured for use in a manufacturing assembly line. Traveling gripper units are provided for transferring subassemblies between assembly line conveyor apparatus and the resin application workstation. The gripper units are also used to transfer subassemblies between the various units of the resin application workstation.

All three units in the resin application workstation include rotating support plates. Each support plate is mounted vertically and enclosed in a walled enclosure or compartment. The support plates in the three units can rotate about horizontal axles. Electrical motors or other drive means such as belt drives coupled to the horizontal axles may power the support plate rotation. The vertical support plates have support fixtures to hold the subassemblies in a substantially horizontal orientation during processing.

The preheating unit and the resin-curing unit heat the component subassemblies to suitable temperatures in preparation for resin application and for resin curing, respectively. The curing unit may include a sub-compartment or section for cooling the processed subassemblies after resin curing. Any suitable heat sources may be used in the preheating and curing units to heat and raise the temperature of the subassemblies. The suitable heat sources may, for example, be resistive heater elements or infrared lamps mounted within the unit compartments. In one embodiment, forced air heating techniques are used to heat the component subassemblies in the units. Forced air convection heating may provide more efficient and uniform heating of a large number of subassemblies. Forced air heating may also be economically advantageous.

In order that the invention herein described can be fully understood, the subsequent description is set forth in the context of resin application in the manufacture of armatures. It will, however, be understood that the invention is equally applicable to other types of dynamo-electric machine components having wound wire coils such as stators, etc.

An embodiment of the present invention is described herein with reference to station 1000 and to the work pieces illustrated in FIGS. 1–7. Armature subassemblies 13 (see, e.g., FIG. 2a) are used herein as illustrative work pieces. Armature subassemblies 13 have stack portions or ferromagnetic core portions around which wire coils are wound at winding machines (not shown) earlier in the assembly line. Portions of the wire coil (portions 13") extend out of the ferromagnetic core portions. Armature subassemblies 13 have axial shafts 13S which protrude from the central ferromagnetic core portions along axis 13'. The axial shafts 13S have extreme ends 13e.

FIG. 1 shows resin application station 1000, which includes preheating unit 1100, resin impregnation unit 1200 adjacent to unit 1100, and resin curing unit 1300 adjacent to unit 1200. Preheating unit 1100 is designed to heat subassemblies 13 by forced air heating to a predetermined temperature. The predetermined temperature may be chosen with consideration to the viscous properties of the subsequently applied resin (in unit 1200). The predetermined temperature may be chosen so that the applied resin has suitable viscosity or other flow characteristics at the raised temperature of wire coils 13" for effective impregnation or saturation of the wire coils 13". Resin impregnation unit 1200 may use conventional tooling for applying resin to the pre-heated wire coils 13". The tooling may include, for example, a series of liquid dispenser units (e.g., dispenser units DU in FIG. 5) for dropping or trickling controlled amounts of liquid resin on the pre-heated wire coils 13'''. The liquid resin may be fed to the liquid dispensers from pump and storage devices, which may, for example, be similar to those described in Santandrea et al. U.S. Pat. No. 4,984,353, Cardini et al. U.S. Pat. No. 5,443,643, Cardini et al. U.S. Pat. No. 5,569,439, Faraoni et al. U.S. Pat. No. 5,401,531, Galassi et al. U.S. Pat. No. 5,919,308, Galassi et al. U.S. Pat. No. 6,024,795, Becherucci et al. U.S. patent application Ser. No. 09/409,038, Becherucci et al. U.S. Pat. No. 6,226,857, and Sabatino et al. European Patent 0,757,425. Resin curing unit 1300 is designed to heat subassemblies 13, by forced air heating, to suitable temperatures for hardening or curing the resin saturating wire coils 13'' that was applied in impregnation unit 1200.

Figure 2:
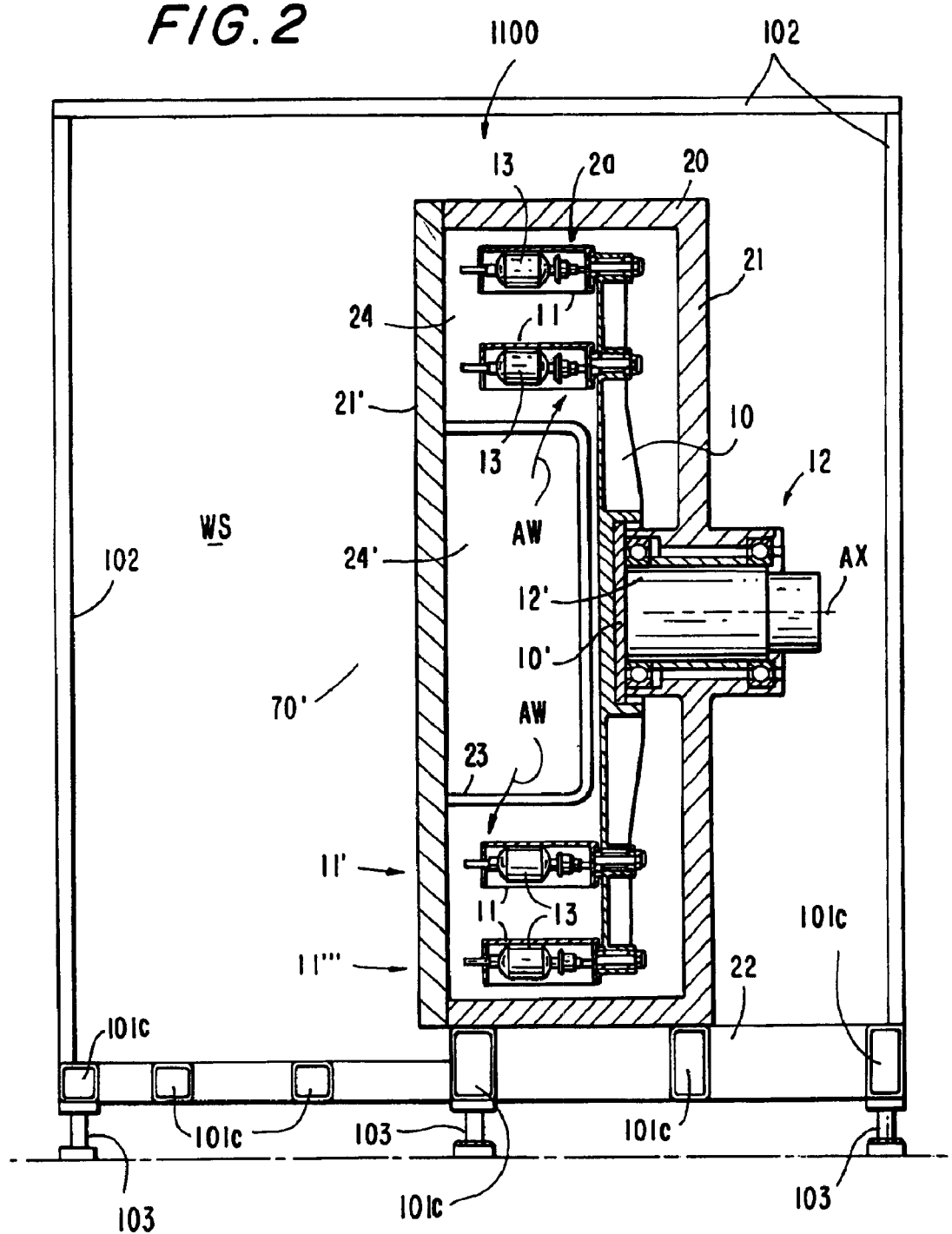
FIG. 2 is a sectional view of the preheating unit of FIG. 1, as seen from directions 2—2 in FIG. 1.
Figure 4:
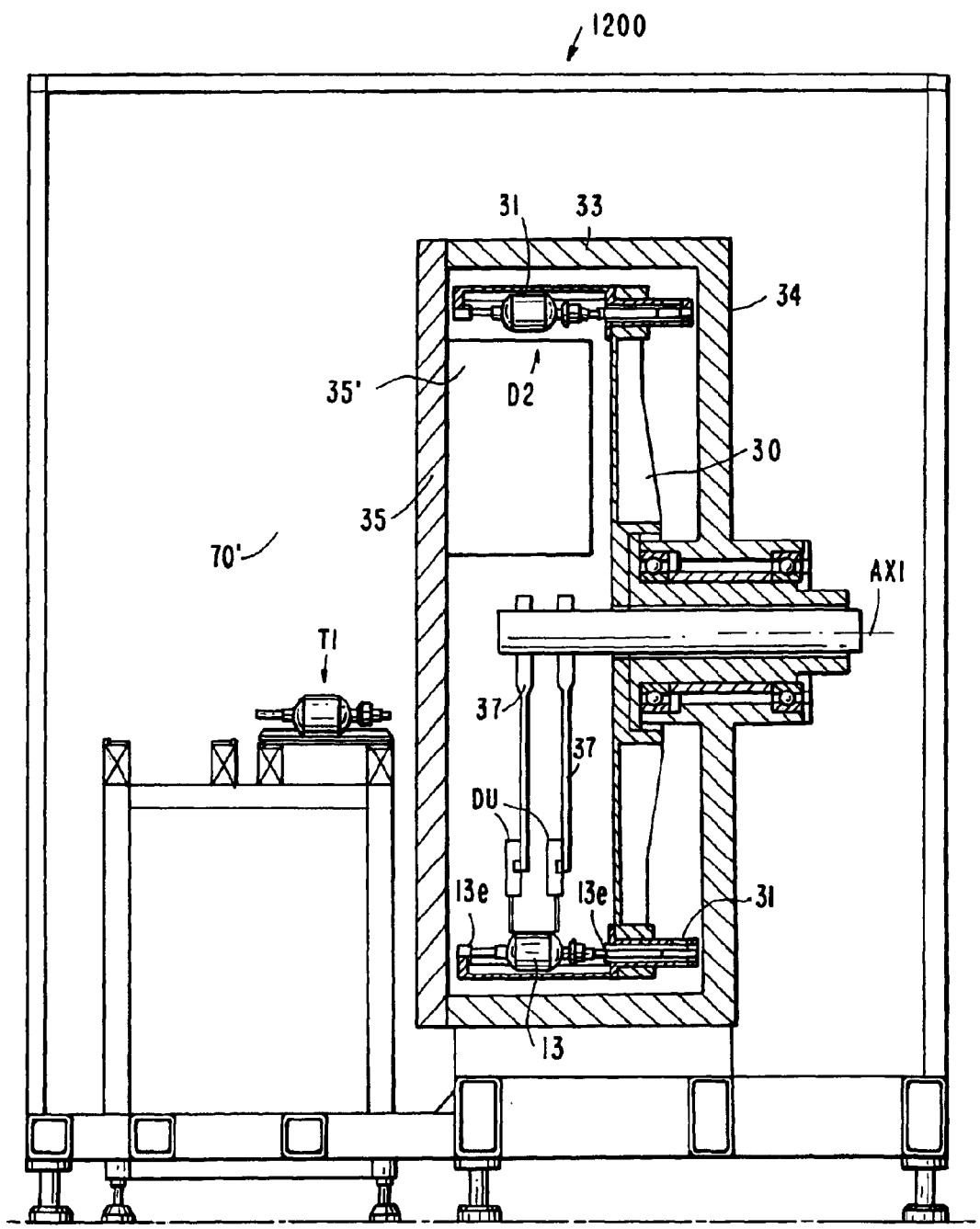
FIG. 4 is a sectional view of the resin impregnation unit of FIG. 1, as seen from directions 4—4 in FIG. 1.
Figure 6:
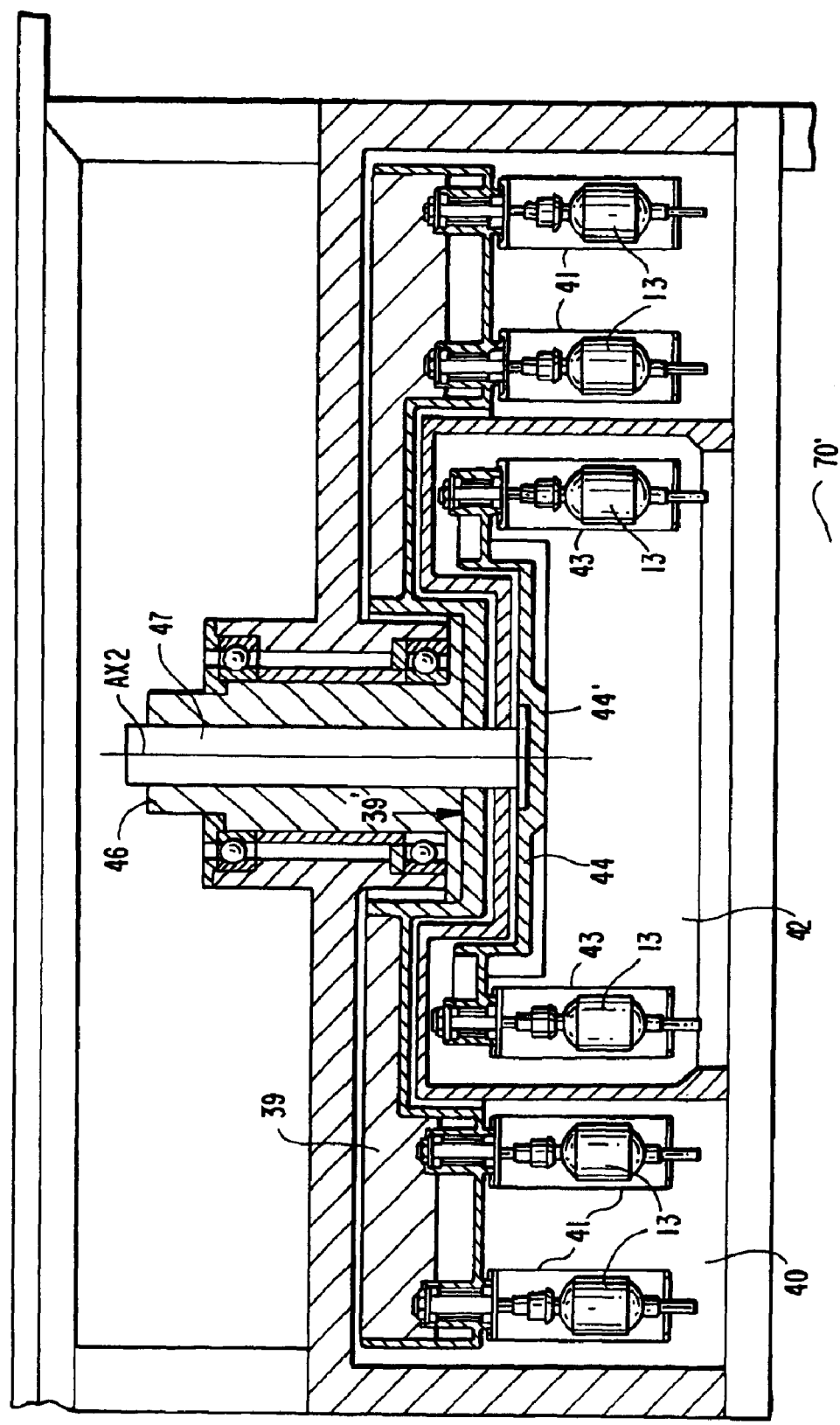
FIG. 6 is a sectional view of the curing unit of FIG. 1, as seen from directions 6—6 of FIG. 1.

All three units 1100, 1200, and 1300 may have drum-like cylindrical structures with front plates covering the front cylinder openings (see, e.g., front plate 21' in FIG. 2, front plate 35 in FIG. 4, and front plate 45 in FIG. 6). All three units 1100–1300 are mounted in an enclosure, for example, cabinet 101. One or more sides of cabinet 101 may be walls or panels 102 attached to a suitable chassis or frame 101c (see, e.g., FIG. 2). Chassis 101c may be supported off an assembly line floor by support legs 103. Support legs 103 may include suitable conventional anti-vibration and leveling mechanisms (not shown). Assembly line conveyor apparatus 73 may be used to move unprocessed armatures for processing by workstation 1000 to a suitable loading position. Loading position T1 is shown, for example, at the left end of cabinet 101. Similarly, processed armatures may be moved away from workstation 1000 from a suitable unloading position. Unloading position T2 is shown, for example, at the right end of cabinet 101. Cabinet 101 may be sufficiently large to allow ample workspace around units 1100–1300 for machine or worker access to service units 1100–1300. For example, the space around units 1100–1300 (see, e.g., space WS in FIG. 2) may be used to deploy transfer tools (e.g., gripper units 70 deployed in front space 70' FIG. 7) for transferring subassemblies to and from units 1100, 1200, and 1300.

FIG. 1 shows station 1000 with front panel 102 and front plates of all three units 1100–1300 removed to expose interior portions of units 1100–1300 for viewing.

Units 1100–1300 include vertical support plates 10, 30 and 39, respectively. Vertical support plates 10, 30 and 39 are circular in shape and are mechanically mounted to rotate about their axes AX, AX1, and AX2, respectively. In preheating unit 1100 numerous support fixtures 11, which hold subassemblies 13 during processing, are disposed on vertical support plate 10 in concentric circular patterns within annular compartment 24. The circular patterns may be chosen with design considerations to factors such as the desired processing batch size and heating efficiency. The central region or inner compartment 24' formed by the annulus of compartment 24 is free of support fixtures 11. Similarly, in resin curing unit 1300 numerous support fixtures 41, which hold subassemblies 13 during the curing process, are disposed on vertical support plate 39 in concentric circular patterns within outer compartment 40. Outer Compartment 40 may optionally have an annular shape with its central core forming an inner compartment 42. Inner compartment 42 may be used as a cooling station to cool subassemblies 13 that previously have been heated for resin curing in outer compartment 40. Inner compartment 42 may include additional vertical support plate 44. Vertical support plate 44 is mounted to rotate about the same axis (AX2) as vertical support plate 39. Vertical support plate 44 may be independent or, alternatively, an integral structural portion of vertical support plate 39. Support fixtures 43, which hold the armatures 13 during the cooling process, are disposed on vertical support plate 44 in a circular pattern. In resin impregnation unit 1200, vertical support plate 30 is similarly provided with support fixtures 31 for holding subassemblies 13 during the resin impregnation process.

The front plates of units 1100–1300 (i.e. front plate 21' FIG. 2, front plate 35 FIG. 4, and front plate 45 FIG. 6) each have windows or apertures in them, through which subassemblies 13 may be loaded into or unloaded from units 1100–1300. Even though the front plates are not shown in FIG. 1, the contours of apertures 25, 36, and 46 corresponding to units 1100, 1200 and 1300, respectively, are schematically represented in FIG. 1 by dashed lines.

Further details of the construction of preheating unit 1100 are shown in FIG. 2. FIG. 2. shows a sectional view of preheating unit 1100, as seen from directions 2—2 of FIG. 1. Vertical support plate 10 consists of a vertical round table-like structure. Vertical support plate 10 is mounted on shaft 12' of shaft and bearing unit 12 so that it can freely rotate about horizontal axis AX. Suitable mechanical means, for example, flange 10', may be used to mount vertical support plate 10 on an end face of shaft 12'. A motor drive (not shown) or other suitable means may be used to turn shaft 12' about axis AX. The drive means used to turn shaft 12' may be electrically connected by suitable links (not shown) to workstation 100's control unit 72 (see FIG. 7) so that the drive means operates under the supervision of control unit 72. The rotation of shaft 12' may be controlled by control unit 72 to meet, for example, unit 1100's process criteria or workflow conditions.

FIG. 2a shows an enlarged portion of vertical support plate 10 to further illustrate details of the disposition of a support fixture 11 carrying an armature subassembly 13. FIG. 2b shows support fixture 11 as viewed from directions 2b—2b of FIG. 2a. Support fixture 11 may have an open cage-like cylindrical structure suitable for holding a subassembly 13 in position for processing. Disk 15 forms the base of the cylindrical structure. A number of horizontal ribs 14 extend outward from disk 15 along the sides of the cylindrical structure to form the open cage-like structure (to the left in FIG. 2a). In operations loading or placing subassembly 13 in support fixture 11 (e.g., using gripper unit 70 in FIG. 7), the longitudinal position of subassembly 13 in support member 11 may be referenced by the abutment of subassembly shaft's distal end 13e against disk 15. Disk 15 is mounted or attached to shaft extension 17 (extending to the right in FIG. 2a). Bearing unit 18 is disposed within vertical support plate 10. Shaft extension 17 may be mounted in bearing unit 18 so that it is free to idle as bearing unit 18 revolves about central axis AX. Bolt 18' or other suitable mechanical means may be used to lock shaft extension 17 in bearing unit 18.

FIG. 2b shows, for example, three horizontal ribs 14, which are attached at equal angular spacings along the circumference of disk 15. Annular ring 16 at the open proximal end (left end of FIG. 2a) of the cylindrical structure retains ribs 14 in position to complete the open cage-like cylindrical structure of support fixture 11. The open annulus of ring 16 is sufficiently large to allow passage of subassembly 13 therethrough. Armature 13 may be placed in or removed from support fixture 11 by movements in direction 13b and 13a, respectively (see FIG. 2a). Ribs 14 provide supporting surfaces to hold subassembly 13 in place. The diameter of the cylindrical structure of support fixture 11 is chosen so that the supporting surfaces of ribs 14 engage the stack portion of the armature. Further, the diameter is also chosen with consideration to provide adequate clearance for the free passage of subassembly 13 in and out of support fixture 11. The chosen diameter may consequently be sufficiently large so that, in operation, subassembly 13's stack portion rests on and is supported by only the two lower most ribs 14 (FIG. 2b). Third upper rib 14, even if not in contact with subassembly 13's stack portion, advantageously serves to constrain subassembly 13 from toppling due to any accidental movement, for example, during equipment or machine malfunctions.

When subassembly 13 rests on and is supported by the two lower most ribs 14, shaft 13S is eccentrically aligned downward with respect to horizontal axis 17' of shaft 17 (e.g., vertically below axis 17' in FIG. 2a). This downward alignment causes the center of gravity of the support fixture 11 (when loaded with subassembly 13) to be vertically lower than axis 17'. This lowering of the center of gravity may prevent rotation of subassembly 13 about its axis 13' as vertical support plate 10 rotates about its axis AX (causing bearing unit 18 to revolve about AX.)

Figure 3:
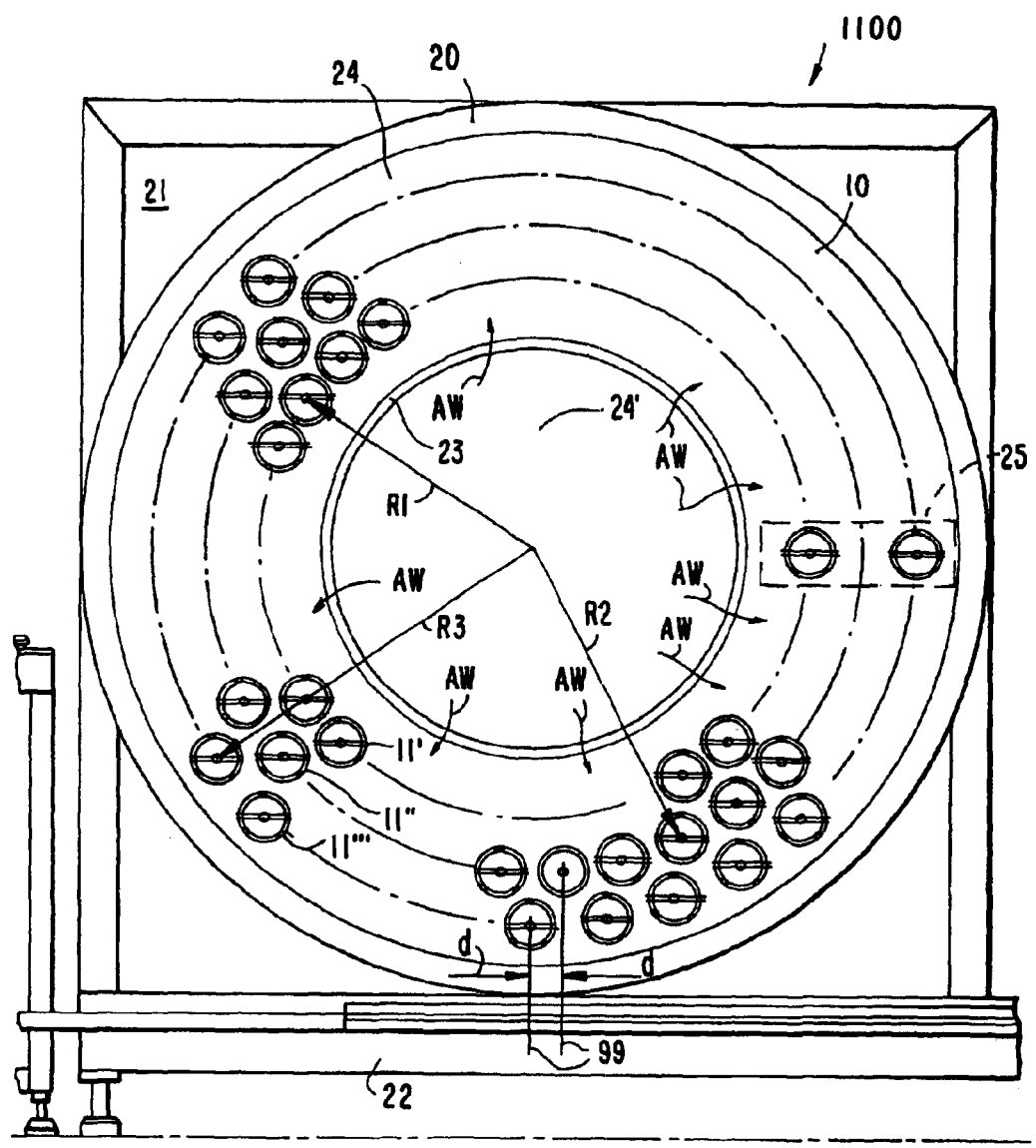
FIG. 3 is an enlarged view of the preheating unit shown in FIG. 1.

Further details of the construction of preheating unit 1100 are described below with reference to FIG. 2 in conjunction with FIG. 3. FIG. 3 is an enlarged view of preheating unit 1100 shown in FIG. 1. Vertical support plate 10 is surrounded by outer cylinder 20, back wall 21, and front plate 21'. Outer cylinder 20 is supported on upstanding frame structure 22. Frame structure 22 may be suitably attached to, or alternatively be an integral part of cabinet 101's chassis 101c. Outer cylinder 20 is open at both ends. Back open end of cylinder 20 is closed by back wall 21. Shaft and bearing unit 12 (to which vertical support plate 10 is attached using flange 10') is centrally mounted on back wall 21. Front open end of cylinder 20 is closed off by front plate 21'. Inner cylinder 23 has an open front end and a closed back end. Front plate 21' closes inner cylinder 23's open front end. Inner cylinder 23 is attached to front plate 21' so that the cylindrical axis is aligned with axis AX, and such that cylinders 20 and 23 are substantially concentric. Inner cylinder 23 has a smaller diameter than the diameter of outer cylinder 20. Thus, the circular sidewalls of the two cylinders delimit an annular compartment 24.

As previously mentioned, support fixtures 11 are disposed on vertical support plate 10 in compartment 24. Compartment 24 serves to provide a defined space for controlling the ambient through which support fixtures 11 travel as vertical support plate 10 rotates about axis AX during the operation of preheating unit 1100.

Flowing heated air through compartment 24 may control the ambient temperature in compartment 24.

Heated air obtained from conventional sources (not shown) may be first supplied or fed into inner cylinder 23's compartment 24'. Alternatively, or additionally, air may be heated using heat sources such as resistive heating elements (not shown) within compartment 24'. The heated air passes from inner cylinder 23 into compartment 24 through holes or openings AW in cylinder 23's walls. The heated air supply is at a sufficiently high temperature to provide an ambient temperature in compartment 24, which substantially corresponds to a predetermined temperature. This predetermined temperature, (as previously mentioned) is the preparatory temperature to which subassemblies are preheated for subsequent resin impregnation processes. Depending on the resins used, the desirable preparatory temperature may, for example, be a temperature in the range of about 120° C. to about 160° C. For uniform and reproducible resin impregnation it is also desirable that subassemblies 13 be uniformly heated. The number, size, and distribution of openings AW in cylinder 23's walls may be designed to ensure even circulation of heated air through compartment 24 to aid in maintaining a uniform ambient temperature in compartment 24. Additionally, as previously described with reference to FIG. 2a, support fixtures 11 hold subassemblies 13 in an open cage-like structure. The openings in a cage-like structure, for example, the openings between angularly spaced ribs 14 (see FIGS. 2a and 2b) expose substantially all surfaces of subassemblies 13 to the heated air flow circulating in compartment 24. This direct exposure to the heated air flow may aid in raising subassemblies 13 temperature rapidly and uniformly to the ambient temperature.

FIG. 3 also illustrates details of an exemplary pattern by which support fixtures 11 are disposed on vertical support plate 10 in compartment 24. The pattern is designed to increase the batch size of subassemblies 13 that may be processed simultaneously in preheater unit 1100. Support fixtures 11 are organized as arrays 11', 11", and 11'", and disposed on concentric circles with radii R1, R2, and R3 (from axis AX), respectively. Support fixtures 11 within any one of the three arrays are disposed with substantially equal radial angular spacings between adjoining support fixtures 11 of the same array along the circumference of the respective circle on which the array is disposed. However, angular positions of support fixtures 11 of any one array are shifted relative to the angular positions of support fixtures 11 of another array. The size of the angular shift may, for example, be about one half the radial angle extended by the diameter of a support fixture 11 disposed in the arrays. An angular shift of this size is illustrated in FIG. 3 as the spacing d between vertical lines 99 passing through the centers of two proximate support fixtures 11 disposed on neighboring arrays 11" and 11'". A similar pattern of support fixtures may be chosen for other units in station 1000, for example, for unit 1300 (FIG. 6). Such a distribution pattern increases the number of support members present in compartment 24. It will be understood that the exemplary pattern shown in FIG. 3 is only illustrative. Alternative disposition patterns of support fixtures 11, which may be more or less dense than the exemplary pattern, may be chosen in accordance with the principles of the invention.

The pattern that is used may be chosen with consideration to the total number of support fixtures 11 in compartment 24, the time that vertical support plate 10 takes to accomplish a revolution about axis AX, and the time it takes to heat subassemblies 13 to the desired predetermined temperature. Loading and unloading operations from a support fixture require that the support fixture be stopped in front of aperture 25. Preferably, the chosen pattern is such that all of the support fixtures 11 are fully utilized (i.e., loaded at all times), and that any newly loaded subassembly 13 is heated to the desired temperature in one revolution of the vertical support plate 10. Under such operating conditions, the operations of unloading a processed subassembly and loading an unprocessed subassembly from any support fixture 11 in compartment 24 may be accomplished at the same time while the support fixture is stopped in front of aperture 25 after one revolution around axis AX. Such operating conditions may minimize the process time and increase workstation throughput.

Loading and unloading subassemblies from a plurality of support fixtures 11 in compartment 24, after every revolution of a support fixture 11, requires intermittent rotation of vertical support plate 10 about axis AX. Stopping periods during which subassemblies may be loaded/unloaded separate the periods of intermittent rotation. For the support fixture pattern shown in FIG. 3, for example, vertical support plate 10 rotates through an angular distance d between the intermittent stops. At this angular periodicity of intermittent rotation, support fixtures in arrays 11', 11" and 11'" that are at sequentially consecutive angular separations d, may be aligned and stopped in front of aperture 25 one at a time in sequence by array.

Figure 5:
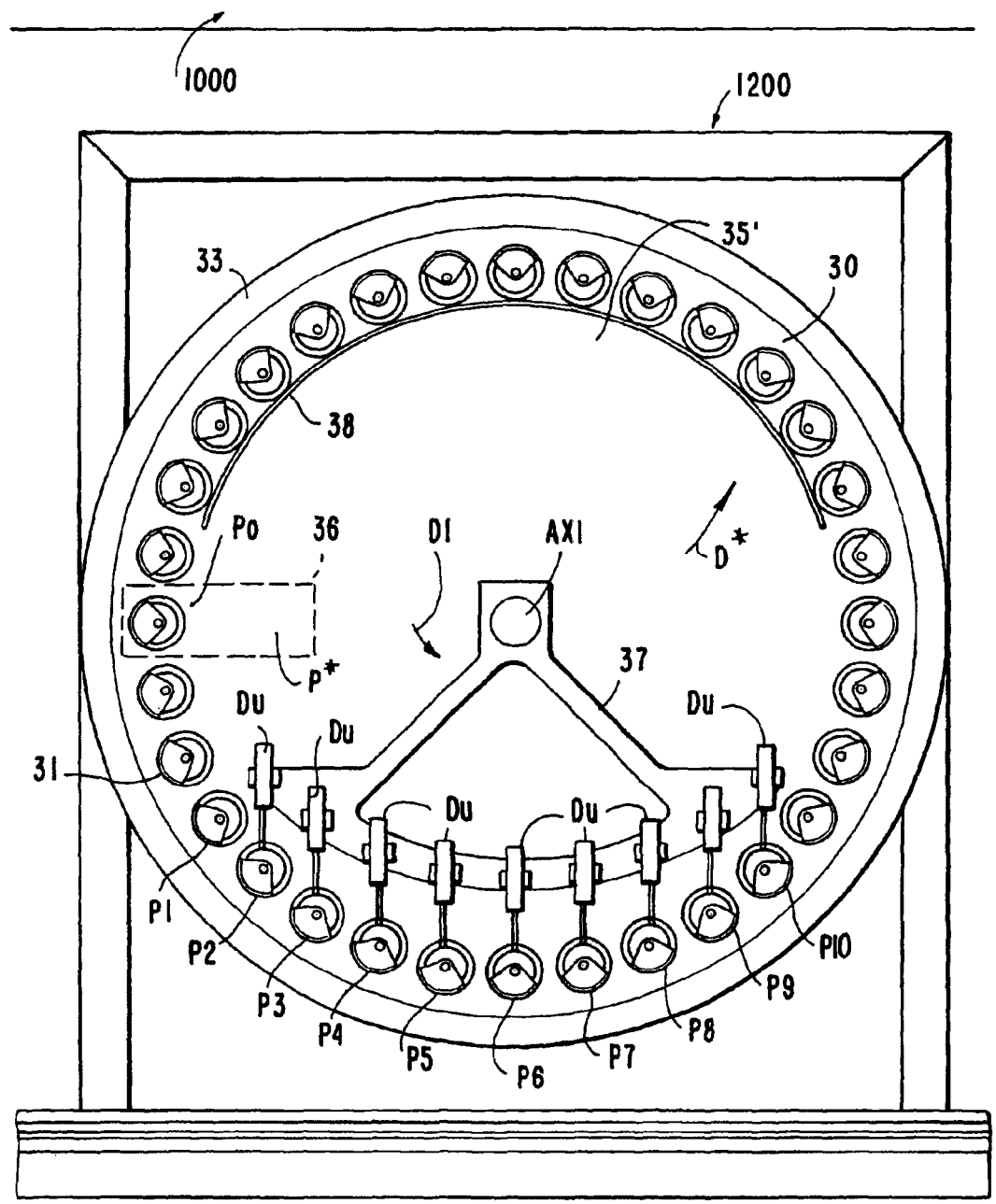
FIG. 5 is an enlarged view of the resin impregnation unit shown in FIG. 1.

Further details of resin impregnation unit 1200 are now described with reference to FIGS. 4 and 5. FIG. 4 shows a sectional view as seen from directions 4—4 of FIG. 1. FIG. 5 is an enlarged view of resin impregnation unit 1200. Resin impregnation unit 1200 includes vertical support plate 30, which is rotatable about axis AX1. The structure and rotational mounting of vertical support plate 30 may be similar to that of vertical support plate 10. In particular, vertical support plate 30 may rotate about axis AX1 by means of a motor drive (not shown) and a shaft of a bearing shaft arrangement similar to shaft and bearing unit 12 which has been described in detail with reference to FIG. 2 above. However, the support fixtures 31 that are disposed on vertical support plate 30 are unlike support fixtures 11 described with reference to FIG. 2 above. Support fixtures 31 may be any suitable fixtures that support the armature subassemblies 13 by shaft ends 13e and leave wire coils portions of subassemblies 13 exposed to allow liquid resin to be dispensed or trickled directly onto the wire coil portions. Support fixtures 31 may, for example, be previously disclosed fixtures similar to those described the references incorporated herein.

Support fixtures 31 are evenly disposed in a circle on or near the outer edge of support plate 30. Support fixtures 31 are aligned so that wire coil portions of subassembly 13 loaded in a plurality of support fixtures 31 are positioned to receive resin from multiple dispenser units DU as vertical support plate 30 rotates around axis AX1.

For example, in FIG. 5 shows nine positions (schematically represented as $P_1$, $P_2$, $P_3$, $P_4$, $P_5$, $P_6$, $P_7$, $P_8$, and $P_9$) directly below corresponding dispensers DU as suitable positions for subassemblies 13 to receive dispensed resin. The multiple resin dispenser units DU may be supported, for example, by central structure 37 or by any other conventional support means. Nine support fixtures 31 may align wire coil portions of nine loaded subassemblies 13 with positions $P_1$–$P_9$ to simultaneously receive resin as vertical support plate 31 rotates around axis AX1. Rotation of vertical support plate 31 in one direction around axis AX1, for example, in direction D1, may be used to advance consecutive support fixtures 31 serially under dispenser units DU.

In operation, intermittent rotation of vertical support plate in direction D1 may be used to sequentially advance and align a consecutive series of support fixtures 31 with positions $P_1$–$P_9$. The intermittent rotations may alternate with stationary or pause periods. During a stationary period dispenser units DU may trickle a quantity of the resin onto subassemblies 13 which are aligned with positions $P_1$–$P_9$ during the stationary period. The resin impregnation processes generally require resin application in several small doses over a period of time rather than in a single dose or a few large doses to properly saturate wire coils with resin. The quantity of resin dispensed onto subassemblies 13 during a stationary period may correspond to a single small resin dose. Multiple applications of the resin dose to a subassembly 13 are obtained advancing the subassembly 13 first through a series of nine possible applications at positions $P_1$–$P_9$. Generally, one series of resin dose applications through positions $P_1$–$P_9$ may provide a sufficient cumulative quantity of resin called for by the manufacturing process. However, if the manufacturing process calls for additional series of resin dose applications, support fixture 31 holding subassembly 13 may be revolved a full circle around AX2 to reposition the subassembly 13 repeatedly through positions $P_1$–$P_9$, for additional applications as desired.

In the operation of unit 1200, a preheated subassembly 13, which has been unloaded from preheating unit 1100 through aperture 45, is quickly transferred into unit 1200 through aperture 36. The preheated subassembly 13 may be loaded into an empty support fixture 31 aligned with loading position P0. Apertures 45 and 36 are located proximately by design to minimize any cooling of subassembly 13 during the transfer. Within a few intermittent rotation periods of support plate 30, this freshly loaded subassembly is advanced from loading position P0 through the series of positions $P_1$–$P_9$. At each of these nine resin application positions, small doses of resin are dispensed onto the wire coil portions of the preheated subassembly. The preheated subassembly then returns to toward position P0 by traveling almost an entire revolution around axis AX1. For the subsequent application of the small doses to be effective, the previously applied resin doses should have fully flowed or settled into the interwire spaces.

Resin impregnation unit 1200 includes optional heated air flow compartment 35' designed to maintain the temperature of the preheated subassemblies loaded into unit 1200 at a raised level suitable for resin flow during the entire time the subassemblies are in unit 1200. Maintaining the temperatures at the raised level aids the settling flow of applied resin into interwire spaces. Compartment 35' is disposed on a portion (indicated generally by direction D*) of the upper half of front wall 35. Compartment 35' may, for example, be shaped as the smaller of the cylinder segments obtained by off-axis cut of a cylinder parallel to its diameter. Top cylindrical wall 38 (FIG. 5) of compartment 35' may run substantially parallel to upper cylindrical wall 33. Top cylindrical wall 38 may be placed sufficiently below cylindrical wall 33 to avoid interference with support fixtures 31 that move through the space defined by wall 38 and upper portions of wall 33. Cylindrical wall 38 also advantageously shields positions $P_1$ to $P_9$ from any resin that may accidentally drip from the armatures traveling above positions $P_1$ to $P_9$.

Heated air is circulated in compartment 35' to provide a heat source for maintaining a suitable high temperature ambient, particularly in the space between wall 38 and upper portions of wall 33. This high temperature ambient allows resin applied at positions $P_1$–$P_9$ to a subassembly 13 to adequately settle into wire coil spaces as subassembly 13 revolves across from position $P_9$ to P0 in direction D1.

In an alternative embodiment of unit 1200, known immersion baths techniques may be used instead of dispensers DU to apply resin to subassemblies 13. In this embodiment, liquid resin bearing trays are placed vertically below resin application positions $P_1$–$P_9$. The trays may be raised vertically so that the bottom portions of subassembly 13 stacks are immersed in liquid resin. This immersion coating of subassembly 13 stacks may be scheduled to occur during stationary periods during which the subassemblies 13 are aligned with positions $P_1$–$P_9$ (between the intermittent rotation of support 30).

In either embodiment of unit 1200, support fixture 31 may rotate subassembly 13 about its axis 13' as it is advanced from positions $P_1$ to $P_9$ so that the applied resin is evenly distributed around subassembly 13 stack portions. The rotation of subassembly 13 may be activated using known techniques such as engaging a toothed pinion disposed on support fixture 31 in conjunction with a moveable rack arrangement (not shown).

Further details of resin curing unit 1300 are now described with further reference to FIG. 1 in conjunction with FIG. 6. FIG. 6 is a section view of station C as seen from directions 6—6 of FIG. 1.

Resin curing unit 1300 includes compartment 40 and an optional cylindrical compartment 42. Compartment 40 may be used for resin curing processes. Compartment 42 may be used to cool subassemblies 13 that have undergone the resin curing process. Subassemblies 13 are cooled, so that they may be output from resin application station 1000 at temperatures substantially close to manufacturing line ambient temperatures. The structural components of resin curing unit may be similar or identical to those of preheating unit 1100. Therefore, to avoid repetition, the description of unit 1300 structural components is limited herein.

Compartment 40 has an annular shape surrounding optional cylindrical compartment 42 as shown in FIG. 6. Subassemblies 13 that are being processed in compartment 40 and compartment 42 are held during processing in support fixtures 41 and 43, respectively. Both support fixtures may have an open cage-like structure, which may be similar or identical to the structure of support fixture 11 (FIG. 2a). Support fixtures 41 are disposed on vertical support plate 39 in compartment 40. Support fixtures 43 are disposed on vertical support plate 44 in compartment 42. Both support fixtures may be disposed on the respective support plates in a manner similar to that used for disposing support fixtures 11 on support plate 10 (FIG. 2a). Both vertical support plates 39 and 44 rotate around the same horizontal axis AX2. Vertical support plates 39 and 44 are attached to coaxial shafts 46 and 47, respectively. Shaft 47 passes through and is coaxially seated in shaft 46. Flanges 39' and 44' may be used to attach vertical support plates 39 and 44 to their respective shafts 46 and 47. Both shafts 46 and 47 may be driven independently of each other to rotate around axis AX2 by respective motor drives (not shown) under the supervision of station control unit 72 (FIG. 7).

Heated air is circulated through compartment 40 to provide a heated ambient in which subassemblies 13 move through compartment 40 as shaft 46 rotates. The temperature of the heated air circulated in compartment 40 may be suitably chosen to promote the resin curing process. On completion of the resin curing process subassemblies 13 are transferred to cooling compartment 42. Cool air may be circulated through compartment 42 to promote rapid cooling of the heated subassemblies 13. After the subassemblies have cooled sufficiently for further processing through the assembly line, the subassemblies 13 may be unloaded from compartment 42.

Figures 7, 7A:
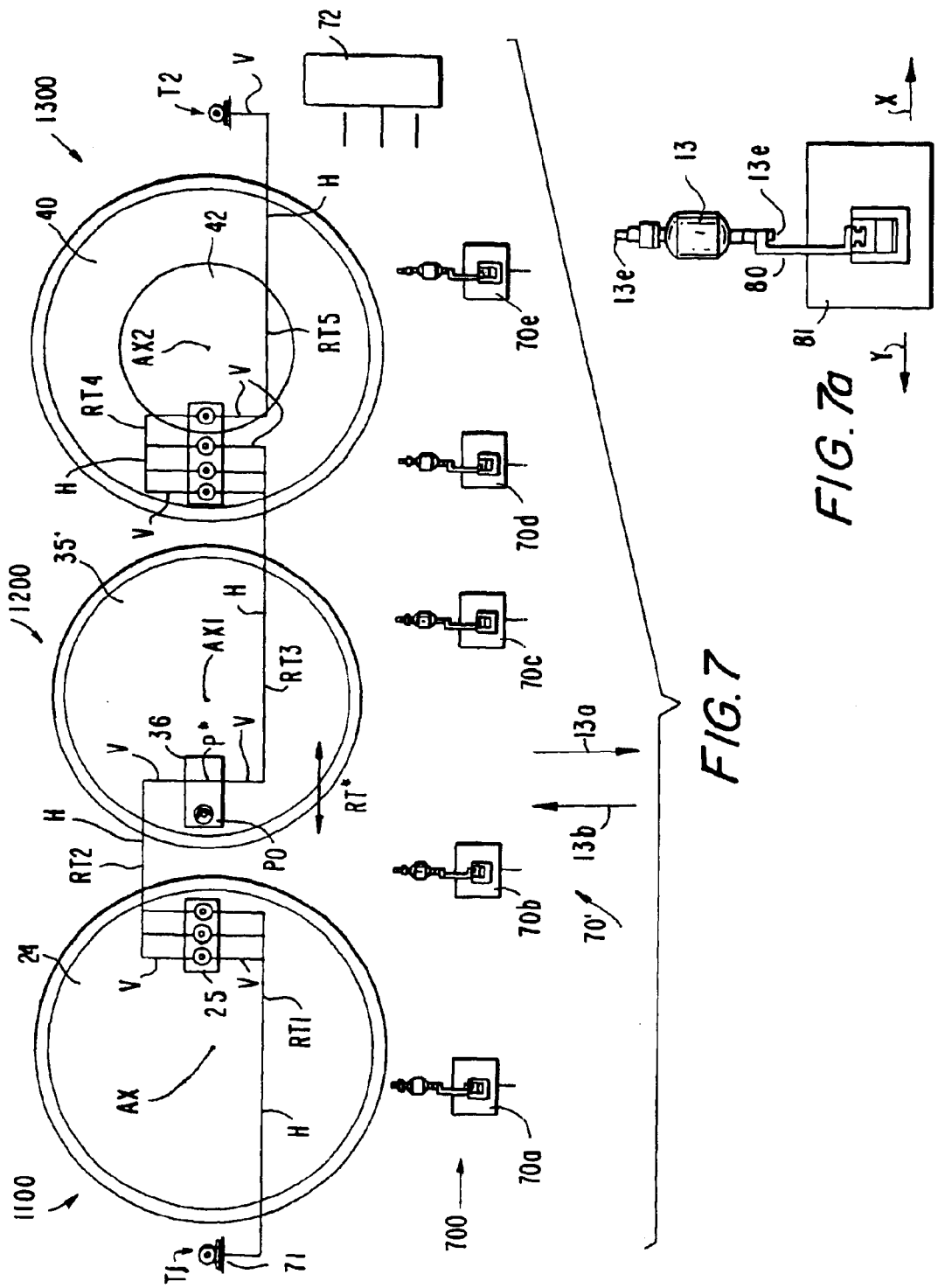
FIG. 7 is schematic representation of the resin application station of FIG. 1, showing the various routes that can be taken by machine components that are processed through the resin application station.
FIG. 7a is an enlarged view of a gripper unit shown in FIG. 7.

As previously mentioned the transfer of subassemblies 13 between units 1100, 1200 and 1300 of station 1000 is accomplished using gripper units 70 shown in FIG. 7. Gripper units 70 are schematically represented in FIG. 7 as viewed along direction X in FIG. 1. The gripper units 70a, 70b, 70c, 70d, and 70e are part of a transfer system 700 disposed in front space 70' (FIGS. 2, 4 and 6) in front of units 1100–1300. The operation of transfer system 700 may be understood with reference to FIG. 7.

Input subassemblies 13 placed in pallets 71 are delivered to resin application station 1000 from downstream assembly line locations on known conveyor apparatus. Pallets 71 stop at position T1 on the left side of unit 1100. Similarly, empty pallets 72 are made available at position T2 on the right side of unit 1300A for transport of output subassemblies 13 that have been processed through resin application station 1000.

With reference to FIG. 7, gripper 70a may be assigned to load input subassemblies into unit 1100. Similarly, gripper unit 70b may be assigned to unload preheated subassemblies 13 from unit 1100, and to load preheated subassemblies 13 in unit 1200. Gripper unit 70c may be assigned to unload resin impregnated subassemblies 13 from unit 1200 and to load the resin impregnated subassemblies 13 in unit 1300. Further, gripper unit 70d may be assigned to unload resin cured subassemblies 13 from unit 1300, and to reload the resin cured subassemblies 13 in compartment 42 of unit 1200. Gripper unit 70e may be assigned to transfer cooled subassemblies from compartment 42 of unit 1300 to waiting pallet 72 for transport to location downstream from station 1000.

Input subassembly 13 received in pallet 71 at position T1 should preferably be loaded in the next available empty support fixture 11 which is aligned with aperture 25. It will be understood that a support fixture in any of units 1100, 1200, and 1300 becomes empty and available for loading after a processed subassembly has been unloaded from the support fixture. For example, in unit 1100 support fixture 11 may become empty and available when a preheated subassembly 13 is unloaded from it. Empty support fixture 11 may belong to any one of three support fixture arrays 11', 11", 11'" in unit 1100. Route RT1 schematically represents a path (H) extending from position T1 toward aperture 25. Three alternative route branches V emanate from RT1 across aperture 25. The three route branches V alternatively lead to a support fixture in arrays 11', 11", or 11'". To transfer input subassembly 13 from pallet 71 to unit 1100, gripper unit 70a first travels along route RT1 to collect input subassembly 13 from pallet 71. Then, gripper unit 70a travels back along RT1, and along an appropriate branch V corresponding to the array with empty support fixture 11 to load subassembly 13 in unit 1100.

Similarly, route RT2 schematically represents a path (H) extending from unit 1100 toward aperture 36 in unit 1200. The three alternate branch lines V extend from aperture 25 to connect with route RT2. Preheated subassembly 13 which is unloaded from support fixture 11 aligned with aperture 25 is transferred by gripper unit 70b along the appropriate branch line corresponding to the array of support fixture 11, and moved along route RT2 toward aperture 36 to a position P*. Position P* is located to the side of an available empty support fixture 31 aligned with position P0 (FIG. 5) in aperture 36. Position P* is located to the side of position P0 to account for the fact that support fixtures 31 are designed to be loaded sideways (RT*) along a path parallel to the face of the vertical support structure on which support fixtures 31 are disposed through an opening parallel to their (fixture 31) longitudinal axis.

Route RT3 schematically represents a path (H) extending from unit 1200 to unit 1300. Three alternate route branches V emanate from RT3 toward aperture 46 in unit 1300. The alternate route branches V lead to corresponding alternate arrays of support fixtures 41 in compartment 40. Similarly, route RT4 schematically represents a path (H) extending from compartment 40 to compartment 42 along unit 1300. Finally, route RT5 schematically represents a path (H) extending from compartment 42 of unit 1300 to an empty pallet available at position T2 to the right of unit 1300. The transfer of processed subassemblies 13 along routes RT3, RT4, and RT5, by gripper units 70c, 70d and 70e, respectively, occurs in fashion similar to that described for subassembly transfers along paths RT1 and RT2.

It will be understood that the two-dimensional representation of routes RT1, RT2, RT3, RT4 and RT5 in FIG. 7 is schematic and for purpose of illustration only. For example, in FIG. 7 branches V are shown as being vertical. In reality, branches V represent movement of the gripper units through corresponding apertures in to and out of units 1100–1300 along directions 13a–13b, a movement which is more accurately described as being perpendicular the page containing FIG. 7.

Further, it will be understood that gripper units 70 are capable of moving in 3-dimensional paths. FIG. 7a shows an enlarged view of one of the gripper units 70 shown in FIG. 7. With reference to FIG. 7a, gripper unit 70 is provided with tongs 80 for gripping the shaft of armature subassembly 13. Tongs 80 are supported on base 81. Base 81 may, for example, be a movable X-Y stage. Tongs 80 may be movable in the Z direction perpendicular to the plane of which the X-Y stage. Conventional drive mechanisms such as motorized drives and gear mechanisms may be used to move tongs 80 and stage 81. For clarity these drive mechanism are omitted from FIGS. 7 and 7a.

To schedule the efficient flow of work through station 1000, The intermittent rotations of vertical supports plates 10, 30, 39 and 44 (in compartments 24, 35, 40 and 42, respectively) may be synchronized so that support fixtures are available for loading and unloading operations at apertures 25, 36, 46 at appointed times. This synchronization may be obtained by suitably programming control unit 72, which supervises the motor drives that rotate vertical supports 10, 30, 39 and 44. Control unit 72 may also supervise gripper units 70a–70e to co-ordinate the transfer of the subassemblies in a synchronized manner.

FIG. 8 lists important control steps that control unit 72 may, for example, perform to achieve the synchronism between units 1100, 1200 and 1300. With reference to FIG. 8, control unit 72 may perform subassembly transfer operations T1a–T1e substantially simultaneously within a time range T1. Time range T1 encompasses the periods of pause in the intermittent rotation of all the vertical support plates in the units. Next, within a range of time T2, control unit may perform intermittent rotation operations T2a–T2d, substantially simultaneously within a time range T2. Thus time range T2 encompasses the periods of rotation in the intermittent rotation of all the vertical support plates in the units. After, T2, control unit may perform operations such stopping the rotational movements and carrying out fixture alignment operations T3a–T3d substantially simultaneously within a time range T3. After which time, control unit 72 may initiate the next cycle of subassembly transfer operations T1a–T1e. One skilled in the art will appreciate that the present invention can be practiced by other than the described embodiment, which is presented for purposes of illustration and not of limitation.

What is claimed is:

1. A workstation for performing steps of a resin application process for dynamo-electrical machine components, said workstation comprising a plurality of units, wherein at least one of said units is of a first type comprising:
   a cabinet for providing a controlled ambient during the performance of a step of said process; and
   a rotating vertical support structure disposed in said cabinet, said support structure having a plurality of fixtures disposed in an annular region thereon configured to hold said components within hollow interiors of the fixtures during the performance of said step, said fixtures comprising open structures configured to allow air to circulate through the interiors of the fixtures to expose substantial surface portions of said held components to said controlled ambient.

2. The workstation of claim 1 wherein a said fixture comprises a structure for receiving said components therein along a path substantially perpendicular to the face of said rotating vertical support structure.

3. The workstation according to claim 1 wherein said cabinet further comprises an annular compartment having said controlled ambient, and wherein said held components travel through said annular compartment as said vertical support structure rotates during the performance of said process step.

4. The workstation according to claim 1 wherein the temperature of said controlled ambient is controlled by flow of heated air through said cabinet.

5. The workstation of claim 1 further comprising a control unit to control rotation of said vertical support structure.

6. The workstation of claim 5 wherein the rotation of said vertical support structure is intermittent with alternating periods of rotation and periods of pause, and wherein at least one of said fixtures is aligned with a predetermined position during said periods of pause.

7. The workstation of claim 6 wherein the angle of rotation during a said period of rotation is less than about one half a radian.

8. The workstation of claim 6 wherein said predetermined position corresponds to a position for loading and unloading components from said aligned fixture.

9. The workstation of claim 1 wherein said plurality of units are disposed adjacent each other, said workstation further comprising movable transfer devices disposed alongside said plurality of units for loading and unloading components from said units, and for transferring components between said plurality of units, wherein said movable transfer devices are capable of motion in linear spatial dimensions.

10. The workstation according to claim 1 wherein a first one of said plurality of units preheats said components in preparation of subsequent resin application.

11. The workstation according to claim 10 wherein a second one of said plurality of units applies resin to said components.

12. The workstation according to claim 11 wherein said second one of said plurality of units is a unit of said first type.

13. The workstation of claim 12 wherein a multiplicity of said fixtures in said second one of said plurality of units are aligned with a multiplicity of resin-receiving positions as said vertical support structure rotates, and wherein at said resin-receiving positions resin is applied to components loaded in said aligned fixtures.

14. The workstation of claim 13 wherein said second one of said plurality of units further comprises resin-dispensing units that are disposed vertically above said resin-receiving positions.

15. The workstation of claim 12 wherein said second one of said plurality of units further comprises vertically movable resin-bearing trays that are disposed vertically below said resin-receiving positions.

16. The workstation according to claim 1 wherein a third one of said plurality of units heats said components to cure the resin applied to said components.

17. The workstation according to claim 1 wherein said plurality of units comprise:
   a preheating unit of said first type for heating components in preparation for subsequent resin application;

a resin application unit of said first type disposed adjacent to said preheating unit for applying resin to preheated components;

a resin-curing unit of said first type disposed adjacent to said resin application unit for heat curing the resin applied to components;

movable transfer devices disposed alongside said plurality of units for loading and unloading components from said plurality of units and for transferring components between said plurality of units; and a control unit to control rotation of said vertical support structures in said preheating, resin application, and resin curing units, and to control said movable transfer devices.

18. The workstation of claim 17 wherein said control unit synchronizes the intermittent rotation of said vertical support structures such that the periods of pause in said preheating unit, in said resin application unit, and in said resin curing unit occur substantially simultaneously such that said vertical support structures are stationary at substantially a same time interval.

19. The workstation of claim 18 wherein said control unit supervises said transfer devices to load and unload components from said plurality of units during said same time interval while said vertical support structures are stationary.

20. A unit for performing a resin application process step for dynamo-electric machine components, said unit comprising:

a cabinet for providing a controlled temperature ambient during the performance of said process step; and a rotating vertical support structure disposed in said cabinet, said support structure having an array of fixtures disposed in an annular region thereon configured to hold said components within hollow interiors of the fixtures, wherein said held components travel through said controlled ambient as said vertical support structure rotates during the performance of said process step, said fixtures comprising open structures configured to allow air to circulate through the interiors of the fixtures to expose substantial surface portions of said held components to said controlled ambient.

21. The unit of claim 20 wherein a said fixture comprises a structure for receiving said components therein along a path substantially perpendicular to the face of said rotating vertical support structure.

22. The unit of claim 20 wherein said controlled temperature ambient is controlled by flowing heated air through said cabinet.

23. The unit of claim 20 where in said cabinet further comprises an annular compartment having said controlled ambient, and wherein said held components travel through said annular compartment as said vertical support structure rotates during the performance of said process step.

24. The unit of claim 20 wherein said cabinet further comprises a compartment for cooling said components after the performance of said process step.

* * * * *